US 8,628,321 B2

(12) United States Patent
Jenkins et al.

(10) Patent No.: US 8,628,321 B2
(45) Date of Patent: Jan. 14, 2014

(54) MOLDING OF NONUNIFORM OBJECT HAVING UNDERCUT STRUCTURE

(75) Inventors: Kurt Allen Jenkins, Sammamish, WA (US); Neil Emerton, Redmond, WA (US); Timothy Large, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 500 days.

(21) Appl. No.: 12/904,041

(22) Filed: Oct. 13, 2010

(65) Prior Publication Data

US 2012/0091603 A1    Apr. 19, 2012

(51) Int. Cl.
*B29C 45/26*    (2006.01)

(52) U.S. Cl.
USPC .......................................... 425/542; 425/592

(58) Field of Classification Search
USPC .................. 425/542, 547, 592, 593; 264/318, 264/328.7, 2.2
See application file for complete search history.

(56) References Cited

U.S. PATENT DOCUMENTS

| 4,340,275 | A | | 7/1982 | Henkes | |
|---|---|---|---|---|---|
| 5,015,169 | A | | 5/1991 | Inzinna et al. | |
| 5,658,522 | A | * | 8/1997 | Fischer | 264/328.7 |
| 6,398,988 | B1 | * | 6/2002 | Jenkins et al. | 264/328.7 |
| 6,724,535 | B1 | | 4/2004 | Clabburn | |
| 6,883,938 | B1 | | 4/2005 | Kohara et al. | |
| 6,906,511 | B2 | | 6/2005 | Chaparala | |
| 7,433,105 | B2 | | 10/2008 | Mau et al. | |
| 7,699,516 | B1 | | 4/2010 | Lee | |
| 7,931,847 | B2 | * | 4/2011 | Jenkins | 264/328.7 |
| 8,216,493 | B2 | * | 7/2012 | Jenkins | 264/328.7 |
| 2002/0125589 | A1 | | 9/2002 | Katzir | |
| 2004/0079114 | A1 | | 4/2004 | Aitken et al. | |
| 2010/0011565 | A1 | | 1/2010 | Zawadzki et al. | |

FOREIGN PATENT DOCUMENTS

| CN | 1669770 A | 9/2005 |
|---|---|---|
| DE | 4313015 C1 | 5/1994 |

OTHER PUBLICATIONS

Brown, et al., "Polymer Waveguide Co-Integration with Microelectromechanical Systems (MEMS) for Integrated Optical Metrology", Retrieved at <<http://www.cs.umass.edu/~btaylor/publications/PS100112.pdf>> vol. 3276, Jan. 26, 1998, pp. 112-122.

(Continued)

*Primary Examiner* — Jill Heitbrink
*Assistant Examiner* — Kimberly A Stewart
(74) *Attorney, Agent, or Firm* — Alleman Hall McCoy Russell & Tuttle LLP

(57) ABSTRACT

Various embodiments are disclosed herein that relate to the molding of an item having a non-uniform thickness and an undercut structure. One disclosed embodiment provides an injection molding device for molding a part having a non-uniform thickness and an undercut structure, the injection molding device comprising a pair of opposing end walls, a first mold surface being stationary with respect to the pair of opposing end walls, and a second mold surface being movable toward the first mold surface such that a first end of the second mold surface is movable a larger travel distance toward the first mold surface than a second end during a molding process. Further, the pair of opposing end walls comprises a slider with an undercut mold surface that is movable in a direction transverse to a direction in which the second mold surface is movable toward the first mold surface.

14 Claims, 4 Drawing Sheets

(56) References Cited

OTHER PUBLICATIONS

Lin, et al., "Micromachined Integrated Optics for Free-Space Interconnections", Retrieved at <<http://nanophotonics.eecs.berkeley.edu/pdfLin%/20-%20Micromachined%20integrated%20optics%20for%20free-space%20interconnections.pdf<<Jan. 29-Feb. 2, 1995, pp. 77-82.

State Intellectual Property Office of China, Office Action of Chinese Patent Application No. 201110309684.X, Sep. 17, 2013, 7 pages.

* cited by examiner

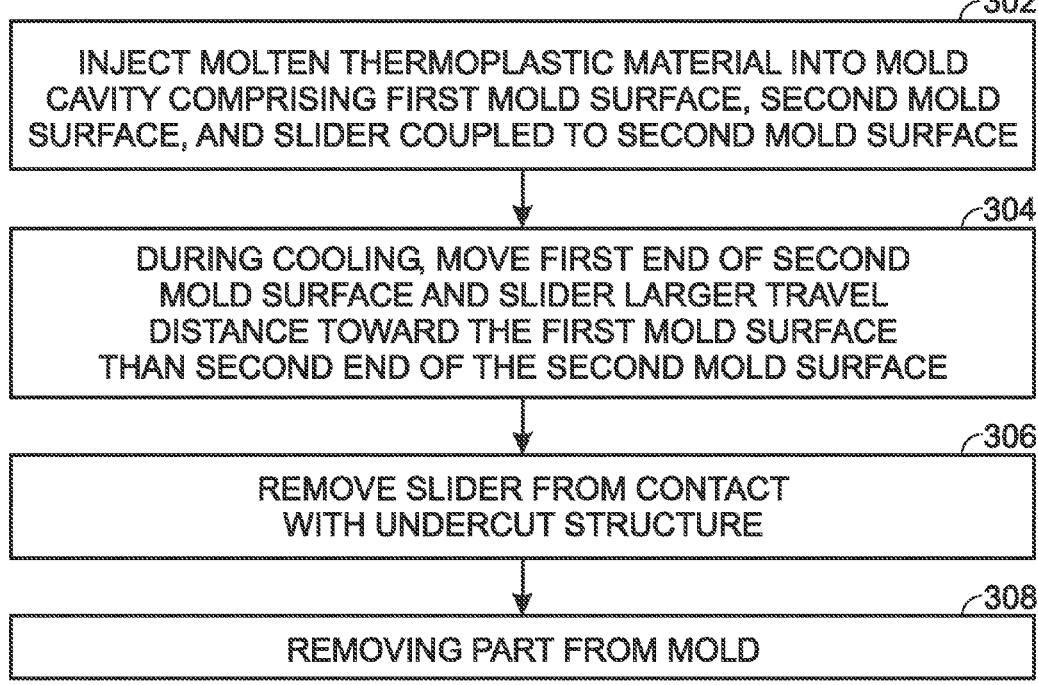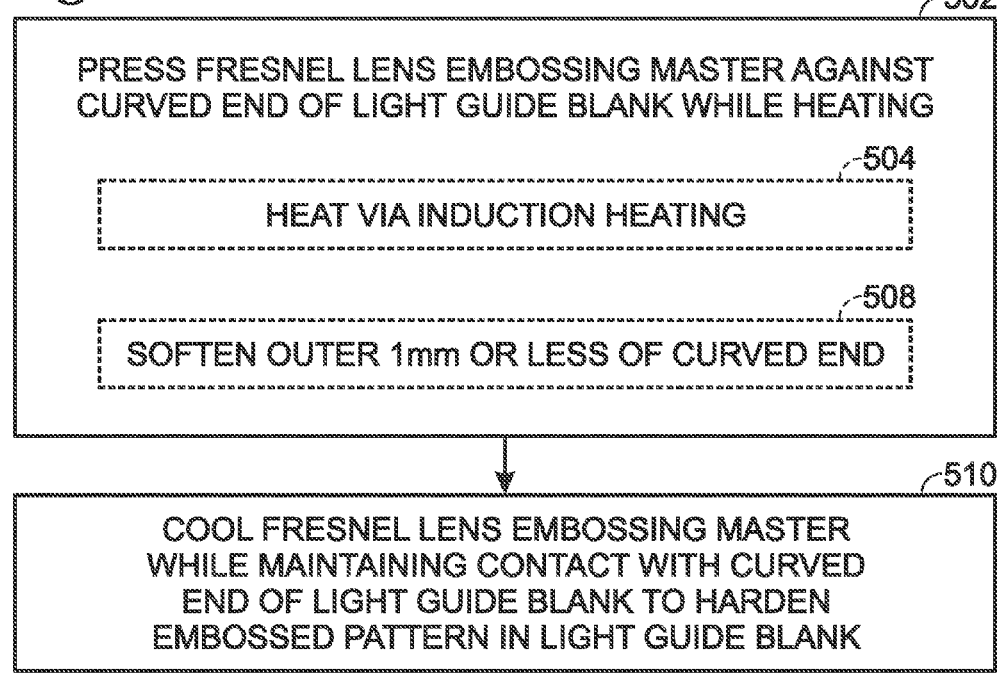

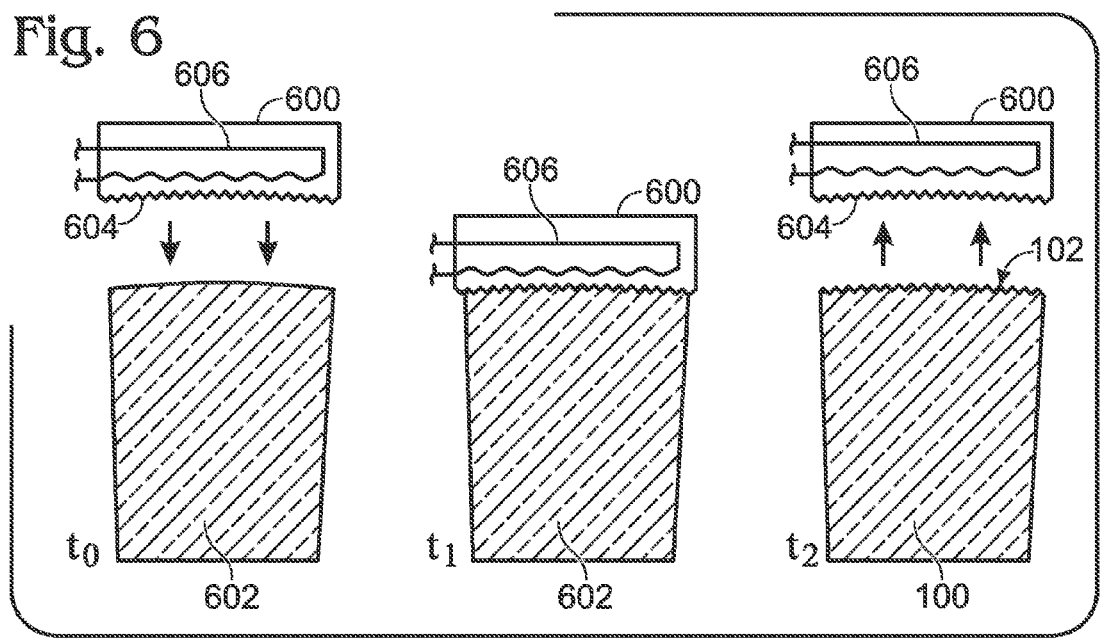

MOLDING OF NONUNIFORM OBJECT HAVING UNDERCUT STRUCTURE

BACKGROUND

A display device may include a light guide, such as an optical wedge, that transmits an image to a display surface, focuses an image on a detector, or does both. Light may propagate between light input/output interfaces in the light guide via total internal reflection. Depending on the application, certain optical features, such as Fresnel lens features, may also be provided in the light guide. A high degree of smoothness and dimensional fidelity may be desired for these features. However, producing such light guides with a reproducibly high level of dimensional fidelity may be pose challenges.

One possible method of forming a light guide is injection molding. Injection molding generally involves injecting molten plastic into a mold, and then allowing the plastic to cool and solidify. However, many plastics shrink while cooling. Therefore, it may be challenging to manufacture parts of a precise thickness via injection molding. Further, because the magnitude of shrinkage is dependent upon the thickness of the plastic, various portions of a non-uniform plastic part, such as a wedge-shaped light guide, may shrink at different rates, thereby compounding the difficulties in molding precision parts via injection molding.

SUMMARY

Various embodiments are disclosed herein that relate to the molding of an item having a non-uniform thickness and an undercut structure. For example, one disclosed embodiment provides an injection molding device for molding a part having a non-uniform thickness and an undercut structure, the injection molding device comprising a pair of opposing end walls, a first mold surface intersecting the pair of opposing end walls and being stationary with respect to the pair of opposing end walls, a second mold surface intersecting the opposing end walls and being movable toward the first mold surface in such a manner that a first end of the second mold surface is movable a larger travel distance toward the first mold surface than a second end of the second mold surface during a molding process. Further, the pair of opposing end walls comprises a slider with an undercut mold surface that is movable in a direction transverse to a direction in which the second mold surface is movable toward the first mold surface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 shows a flow diagram depicting an embodiment of a method of forming a molded article having a non-uniform thickness and an undercut structure.

FIG. 5 shows a flow diagram depicting another embodiment of a method of forming a molded article having a non-uniform thickness and an undercut structure.

FIG. 6 shows schematic depiction of a sequence of mold movements made during an embodiment of an embossing process according to the present disclosure.

DETAILED DESCRIPTION

As mentioned above, injection molding of a part having a non-uniform thickness, such as an optical wedge, may be challenging in that materials used for such parts may shrink during solidification, thereby causing non-uniform shrinkage due to the varying thickness of the part. Shrinkage during molding of a uniform part may be compensated for by moving one surface of a mold toward another surface in a linear manner as the plastic cools and sets. However, in the case of a non-uniform part, such linear motion may not work, as thinner portions of the part that undergo less shrinkage may cause the mold to lock, and thereby not permitting further motion of the mold as the thicker portion of the part continues to set up. This may cause the final part to have incorrect dimensions, and also may impact reproducibility of the molded part.

Figure 1:
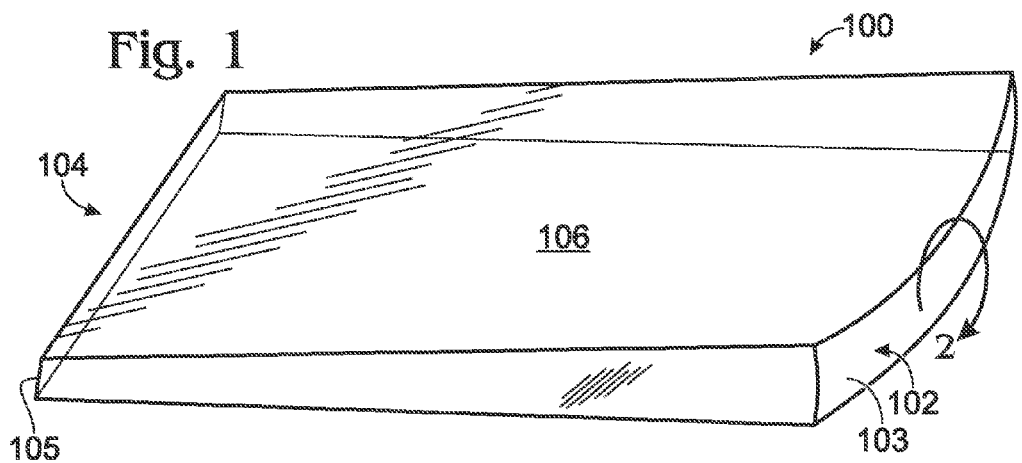
FIG. 1 shows an embodiment of an optical wedge comprising an undercut structure.
Figure 2:
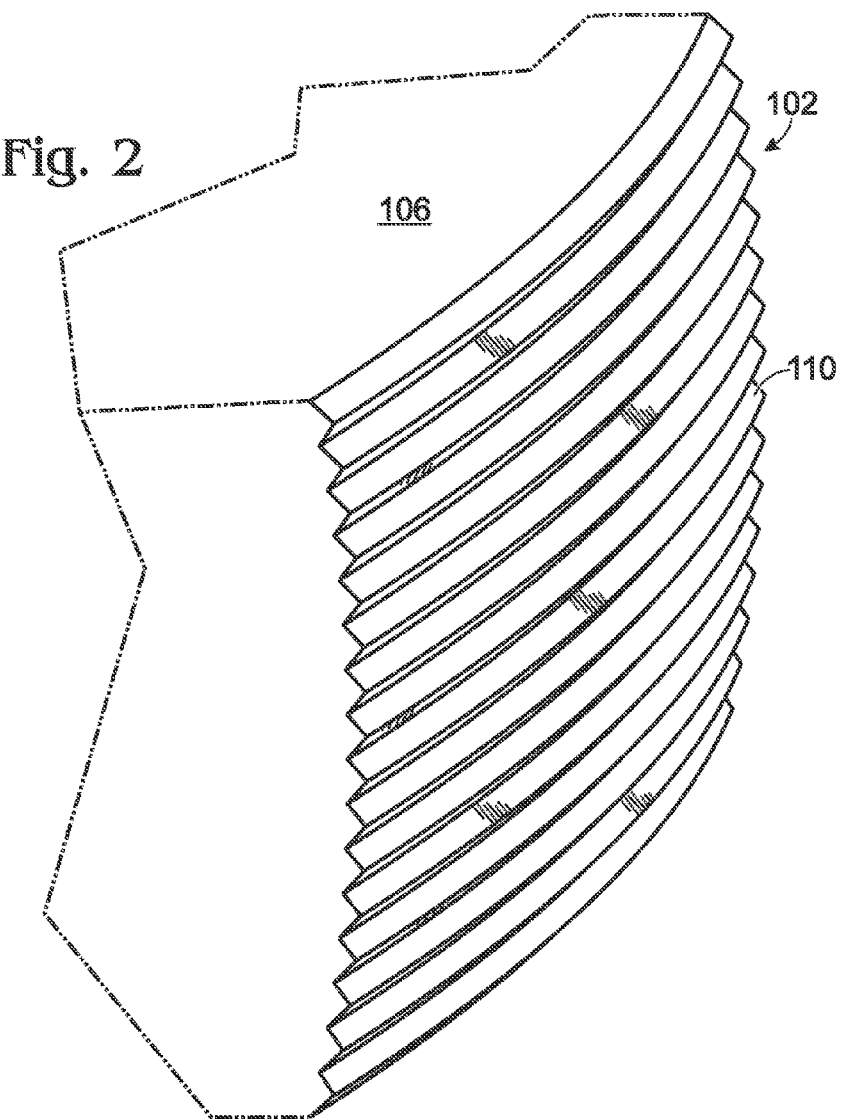
FIG. 2 shows a magnified view of the undercut structure of the embodiment of FIG. 1.

Further, some light guides may have a Fresnel lens structure into the light guide surface. FIGS. 1 and 2 show an example embodiment of a wedge-shaped light guide 100 that comprises a faceted Fresnel lens structure 102 molded into a curved thick end 103 of the light guide 100. The curved thick end 103 of the light guide has a cylindrical, toroidal, spherical, or other suitable curvature that acts as a collimating lens to collimate light traveling from a first light interface 104 at a thin end 105 of the light guide 100 to a second light interface 106 at a major face of the light guide 100 (depicted as an upper surface of the wedge in FIG. 1).

FIG. 2 shows a magnified view of the faceted Fresnel lens structure 102. It will be understood that the relative dimensions of the facets and curvature illustrated in FIG. 2 may be exaggerated for clarity. The Fresnel lens structure 102 comprises a plurality of facets 110 that alternately face toward and away from the second light interface 106 of the light guide 100. Careful selection of the angle and sizes of the facets, in addition to careful selection of the curvature of the curved thick end 103 of the light guide 100, may allow light from a point source placed at the first light interface 104 to fan out toward the curved thick end 103 via total internal reflection, be collimated by Fresnel lens structure 102, and then emerge from all parts of the second light interface 106. In other embodiments, the light guide 100 may be configured to cause light to emerge from the major face opposite interface 106, and/or from both light interface 106 and the opposite face However, uncontrolled shrinkage of the light guide 100 and/or improper positioning of and/or molding of the facets during molding may cause improper functioning of the light guide 100.

Accordingly, FIG. 3 illustrates an embodiment of a method 300 of injection molding an article, such as light guide 100, having a non-uniform thickness and an undercut structure. Generally, the method involves moving one molding surface toward another in a nonlinear manner during molding to maintain contact between the mold and molded part where non-uniform shrinkage occurs. The undercut faceted Fresnel lens structure 102 may be molded via a slider, which is a part configured to be moved in a direction transverse to the open/ close mechanism of a mold, thereby allowing removal of the mold surface that defines the undercut structure (herein after "undercut mold surface") prior to removal of the light guide 100 from the mold. The slider may be coupled either to a moving surface or a stationary surface of the mold. In some cases, the Fresnel lens facet pattern may be provided as an attachment to a slider of an injection molding tool, such that the slider attachment with the Fresnel pattern is made separately from the other mechanical parts of the slider. It will thus be understood that the term "slider" as used herein may also comprise such a slider attachment.

The Fresnel lens pattern of the undercut mold surface may be formed by any suitable method for producing a highly accurate, highly smooth surface. For example, the Fresnel lens pattern may be formed via five axis optical machining methods. Proper positioning of the slider on the mold during a molding process may be accomplished via a precision-ground guide that contacts the slider during molding. The use of such techniques may allow alignment of the slider to within 0.05 degrees of accuracy of the wedge light guide center line, and may help to achieve smoothness on the order of 2-10 nanometers roughness average.

Method 300 first comprises, at 302, inject molten thermoplastic material into a mold cavity defined at least partly by a first mold surface, second mold surface, and slider coupled to the second mold surface. This may optionally include heating the mold surfaces such that plastic injected into the mold does not instantly start to harden on the mold surfaces.

Figure 4:
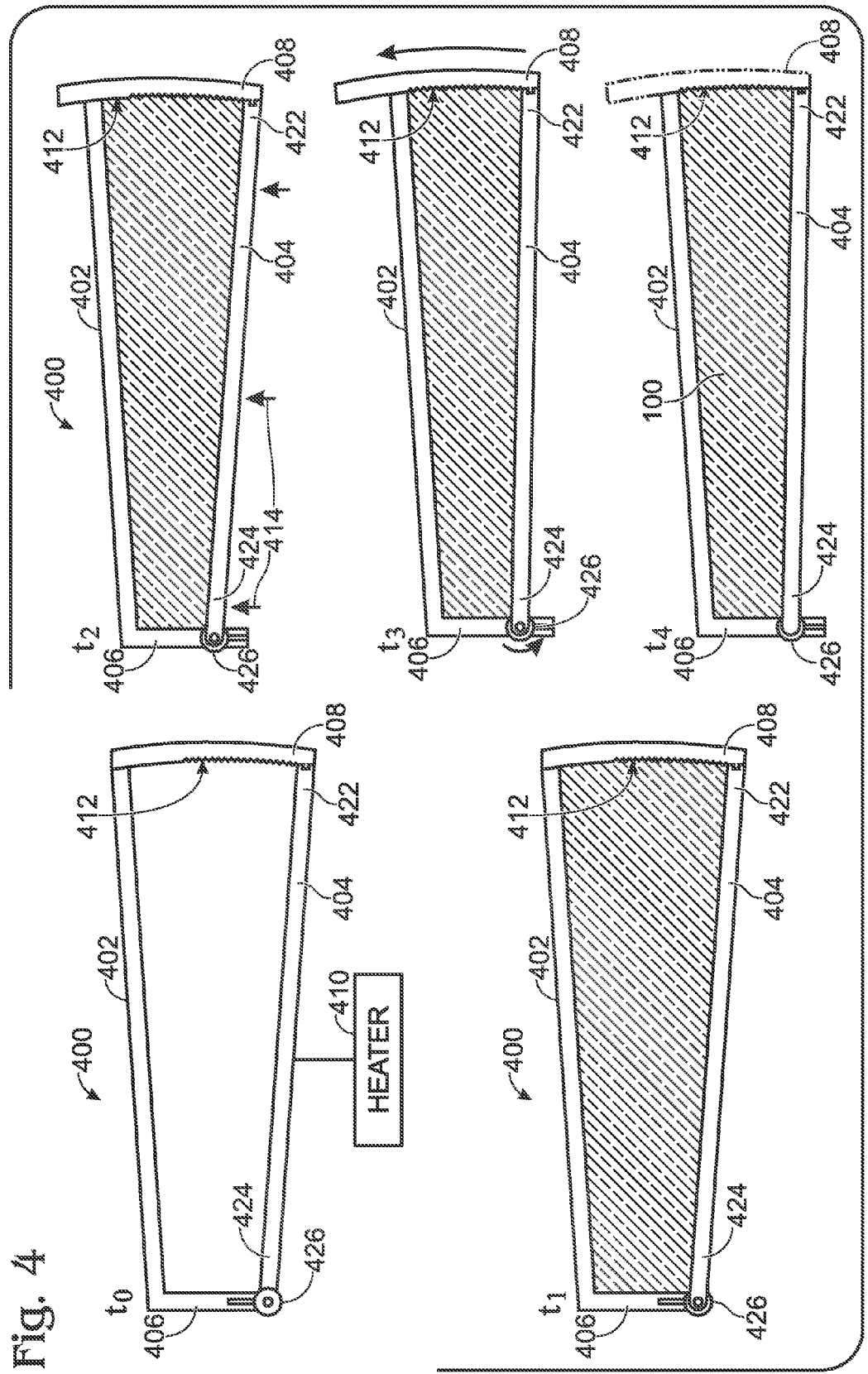
FIG. 4 shows a schematic depiction of a sequence of mold movements made during an embodiment of an injection molding process according to the present disclosure.

FIG. 4 shows a schematic depiction of an embodiment of an injection molding device 400 at various times during the performance of method 300. Injection molding device 400 comprises a first mold surface 402, a second mold surface 404, and a pair of opposing end walls 406 and 408. The injection molding device also may include sides (not shown) that extent between the opposing end walls 406 and 408 to fully enclose a mold cavity. The first mold surface 402 intersects the end walls and is stationary with respect to the pair of opposing end walls 406 and 408. The second mold surface 404 also intersects the pair of opposing end walls 406 and 408, and is movable toward the first mold surface during a molding process in such a manner that a first end of the second mold surface can move a larger travel distance toward the first mold surface than a second end of the second mold surface during a molding process. Heating of the injection molding device 400 prior to the injection of thermoplastic material at time $t_0$ may be performed via a heater 410. While the schematic depiction of FIG. 1 shows the heater 410 connected to the second molding surface 404, it will be understood that any surface of the injection molding device 400 may be heated prior to injecting plastic into the injection molding device 400.

Opposing end wall 408 takes the form of a slider having the aforementioned undercut molding surface, illustrated at 412. The opposing end wall 408 thus may be removed by sliding the wall in a direction perpendicular to the plane of the page to remove the undercut molding surface from contact with the Fresnel lens surface. This may allow removal of the molded light guide 100 without damaging the Fresnel lens structure 102 or the undercut molding surface. It will be understood that the dimensions of the curvature, Fresnel lens facet size, and other dimensional aspects of the injection molding may be exaggerated in FIG. 4 for clarity.

Returning to FIG. 3, the thermoplastic material may be injected into the cavity in any suitable manner. For example, in some embodiments, the molten thermoplastic material may be injected through a gate located on one of the non-major face sides (e.g. the sides that intersect second light interface 106) that extend from the Fresnel lens structure to the first light interface, on the first light interface, or at any other suitable location.

FIG. 4 shows the injection molding apparatus after injection of the thermoplastic material at $t_1$. The thermoplastic material may comprise any suitable material. In the case of an optical wedge, the thermoplastic material may be transparent, and in more specific embodiments, may comprise a material such as poly(methyl methacrylate) (PMMA), polycarbonate and/or polycyclic olefin. It will be understood that these materials are presented for the purpose of example, and that any other suitable material may be used in any other suitable molding process.

Method 300 next comprises, at 304, cooling the thermoplastic material to harden the material, and while cooling, moving a first end of second mold surface and also the slider a larger travel distance toward the first mold surface than a second end of the second mold surface. This allows the mold surfaces to remain in contact with the light guide even as the light guide shrinks nonuniformly during molding, thereby achieving desired dimensional and surface properties in the final molded part.

The movement of the first end of the second mold surface farther than the second end of the second mold surface may be accomplished in any suitable manner. For example, in some embodiments, method 300 may include linearly and rotationally moving the second mold surface toward the first mold surface, either simultaneously or during different phases of a molding process. The term "linearly moving the second mold surface toward the first mold surface" refers to movement of the second mold surface such that a first end of the second mold surface moves a same physical travel distance as does a second end of the second mold surface.

As an example, at time $t_2$ FIG. 4 illustrates at 414 linear compression being applied to the second mold surface 404 in a direction toward first mold surface 402, such that a first end 422 of the second mold surface 404 and a second end 424 of the second mold surface 404 move approximately a same physical travel distance toward first mold surface 402 during a first phase of molding. In some embodiments, injection molding device 400 may include a physical stop to limit an amount of physical travel distance of the second mold surface so that second mold surface 404 may be linearly moved toward first mold surface 402 for a portion of its travel path toward first mold surface 402. While the second mold surface 404 is depicted as comprising an entire bottom side of the mold cavity (referring to the orientation of the mold shown in FIG. 4), it will be understood that in some embodiments, a moveable portion of the second mold surface may comprise a portion of a side of the mold cavity.

The end wall 408 comprising the slider having the undercut molding surface 412 may be configured to be coupled either to first mold surface 402 or second mold surface 404. In the depicted embodiment, the end wall 408 is coupled to the second molding surface, such that the end wall 408 moves relative to the first mold surface 402 while the thermoplastic material hardens.

Continuing with FIG. 4, after a predetermined distance of linear travel of second mold surface 404, at time $t_3$ the second mold surface 404 is rotationally moved toward the first mold surface 402 about an axis at the second end 424 of second mold surface 404. As such, the first end 422 of second mold surface 404 moves a larger physical travel distance than does the second end 424 of second mold surface 404. In this manner, linear movement of the second mold surface 404 toward first mold surface 402, may be used to achieve a desired thickness at a thin end of the molded part, and rotational movement of the second mold surface may be used to achieve a desired thickness at the thick end of the part.

The second mold surface 404 may be rotated in any suitable manner. For example, the injection molding device 400 may include a hinge 426 about which second mold surface 404 may rotate. In the depicted embodiment, hinge 426 is coupled to end wall 406, but it will be understood that the second mold surface 404 may be coupled to any other suitable location of the injection molding device 400. It will be understood that the term "hinge" as used herein may include, but is not limited to, hinges, pivots, and any other mechanically rotational couplings of two parts.

The injection molding device 400 may be configured to move the second mold surface 404 toward the first mold surface 402 in any suitable manner. For example, in some embodiments, a molding machine to which the injection molding device 400 is coupled may include a compression core configured to move the second mold surface toward the first mold surface. Such a compression core may include a cam mechanism, hydraulic cylinders, gear rack and pinion, or any other suitable mechanism for moving the second mold surface.

Continuing with FIG. 3, method 300 next comprises, at 306, removing the slider from contact with the light guide after molding, and then at 308, removing the light guide from the mold. Referring to FIG. 4, removing the slider from contact with the light guide may comprise moving the slider in a direction transverse to the direction of the movement of the second mold surface toward the first mold surface. In the specific example of FIG. 4, the slider may be removed by moving the slider in a direction generally perpendicular to the plane of the page until the undercut mold surface no longer obstructs the removal of the finished part from the mold. The mold with the slider removed is illustrated in FIG. 4 at $t_4$, with the location of the removed slider shown in dashed lines.

Thus, injection molding as described in the context of FIGS. 3 and 4 allows for precisely control of the various thickness of a part having nonuniform thickness by linearly and rotationally moving the second mold surface toward the first mold surface in a controlled manner so that the mold provides compressive force to the entire part during an entire cooling cycle.

FIG. 5 shows a flow diagram depicting another embodiment of a method of forming a Fresnel lens structure on a light guide. Instead of forming the Fresnel lens structure during the same molding process used to form the overall light guide structure, method 500 comprises embossing the Fresnel lens structure onto a curved end of a pre-formed light guide blank. The light guide blank may be formed in any suitable manner. For example, in some embodiments, the light guide blank, including the curved end, may be formed via extrusion and machining, followed by casting or melting of outer layer of one or more surfaces of the light guide to form a desirably smooth finish.

Method 500 comprises, at 502, pressing a Fresnel lens embossing master against the curved end of the light guide blank while heating the embossing master to soften the curved end of the light guide blank. The Fresnel lens master may be heated in any suitable manner. For example, in some embodiments, the Fresnel lens master may be heated via induction, as illustrated at 504. Further, the Fresnel lens master may be heated for any suitable duration of time. Generally, shorter heating times may lead to faster throughput and lower production costs. In some embodiments, the Fresnel lens facets are sufficiently small (e.g. having a pitch of 200-400 microns, and a depth of approximately 20 of the pitch) that only a very thin surface layer of the curved end of the light guide blank is softened. Thus, in some embodiments, the Fresnel lens master is heated sufficiently long to soften a surface layer of the curved end of the light guide blank having a depth of 1 mm or less, as indicated at 506. As a non-limiting example, in some embodiments, the Fresnel lens master may be heated for a duration of between thirty seconds and one minute. In other embodiments, the Fresnel lens master may be heated for a suitable duration outside of this range.

Next, method 500 comprises, at 508, cooling the Fresnel lens embossing master while maintaining the Fresnel lens embossing master in contact with the curved end of the light guide blank. This allows the curved end of the light guide blank to harden while in contact with the Fresnel lens embossing master, thereby embossing the Fresnel lens pattern into the curved end of the light guide blank to harden an embossed pattern in the curved end of the light guide blank, thereby forming the light guide.

FIG. 6 shows a schematic depiction of an embodiment of a Fresnel lens embossing master 600 configured to emboss a Fresnel lens pattern into a curved end of a light guide blank 602. The depicted Fresnel lens embossing master is configured to contact an entire surface of the curved thick end of the light guide master, and thus comprises a molding surface 604 having, in addition to the Fresnel lens pattern, a curvature configured to match the curvature of the curved thick end of the light guide blank. As such, the molding surface 604 of the Fresnel lens embossing master may have a toroidally, cylindrically, or spherically curved surface, or may have any other suitable curvature. A heater, such as an induction heater, is shown schematically at 606.

The Fresnel lens embossing master 600 may be made in any suitable manner. For example, the Fresnel lens embossing master 600 may be made via an electroplating process from a five-axis optical machined master using a nickel chrome substrate. Such a master may have a sufficiently smooth surface to form a Fresnel lens structure having a roughness average of 2-10 nanometers. Positional accuracy of the Fresnel lens embossing master may be controlled by precision fixture alignment (e.g. using precision-ground guides to align the light guide blank and the Fresnel lens embossing master), as well as micropressure adjustment and thermal control of the system.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An injection molding device for molding a part having a non-uniform thickness and an undercut structure, the injection molding device comprising:
   a pair of opposing end walls;
   a first mold surface intersecting the pair of opposing end walls and being stationary with respect to the pair of opposing end walls;
   a second mold surface intersecting the opposing end walls and being movable toward the first mold surface in such a manner that a first end of the second mold surface is movable a larger travel distance toward the first mold surface than a second end of the second mold surface during a molding process;

wherein the pair of opposing end walls comprises a slider with an undercut mold surface that is movable in a direction transverse to a direction in which the second mold surface is movable toward the first mold surface.

2. The injection molding device of claim 1, wherein the slider is coupled to the first mold surface.

3. The injection molding device of claim 1, wherein the slider is coupled to the second mold surface.

4. The injection molding device of claim 1, wherein the undercut mold surface defines a Fresnel lens structure.

5. The injection molding device of claim 1, wherein the second mold surface is movable linearly toward the first mold surface for a first phase of molding, and then movable rotationally for a second phase of molding.

6. The injection molding device of claim 1, wherein the second mold surface is simultaneously linearly and rotationally movable toward the first mold surface.

7. The injection molding device of claim 1, wherein the injection molding device is configured to mold an optical wedge comprising a Fresnel lens structure.

8. The injection molding device of claim 7, wherein the slider is configured to mold the Fresnel lens structure, and wherein the slider has an alignment within 0.05 degree accuracy relative to a center line of the optical wedge.

9. The injection molding device of claim 1, further comprising a heater configured to heat one or more of the first mold surface, the second mold surface, and the pair of opposing end walls.

10. A method of injection molding a part having a non-uniform thickness, the method comprising:

injecting a molten thermoplastic material into a mold cavity, the mold cavity being defined by a first mold surface, a second mold surface, and a pair of opposing end walls intersecting the first mold surface and the second mold surface, the pair of end walls comprising a slider coupled to the second mold surface, the second mold surface and slider being moveable relative to the first mold surface during a molding process, wherein the slider has an undercut mold surface and said slider is movable in a direction transverse to a direction in which the second mold surface is movable toward the first mold surface; and during cooling of the thermoplastic material in the mold cavity, moving the second mold surface and the slider relative to the first mold surface such that a first end of the second mold surface and the slider move a larger travel distance toward the first mold surface than does a second end of the second mold surface, thereby forming the part having the non-uniform thickness;

removing the slider from contact with the part having the non-uniform thickness; and removing the part having the non-uniform thickness from the mold.

11. The method of claim 10, wherein the part having the non-uniform thickness is an optical wedge.

12. The method of claim 10, wherein the undercut mold surface of the slider defines a Fresnel lens structure.

13. The method of claim 10, wherein removing the slider comprises moving the slider in a direction transverse to a direction in which the second mold surface is movable relative to the first mold surface.

14. The method of claim 10, wherein moving the second mold surface toward the first mold surface comprises moving the second mold surface linearly toward the first mold surface for a first phase of molding, and then moving the second mold surface rotationally toward the first mold surface for a second phase of molding.

* * * * *